United States Patent [19]

Wilkas et al.

[11] E Re. 30,012

[45] Reissued May 29, 1979

[54] MAGNETIC OBJECT DETECTION DEVICE

[75] Inventors: Joseph R. Wilkas, Walpole; Christos B. Kapsambelis, Canton; Richard H. Tuhro, Norwood; Christopher C. Reynolds, Stoughton, all of Mass.

[73] Assignee: Computer Identics Corporation, Westwood, Mass.

[21] Appl. No.: 871,128

[22] Filed: Jan. 19, 1978

Related U.S. Patent Documents

Reissue of:

[64] Patent No.: 3,964,703
Issued: Jun. 22, 1976
Appl. No.: 559,252
Filed: Mar. 17, 1975

[51] Int. Cl.[2] ..... B61L 1/16

[52] U.S. Cl. ..... 246/34 R; 246/247; 246/249

[58] Field of Search ..... 246/34 R, 34 CT, 77, 246/193, 202, 247, 249, 255; 340/38 R, 38 L; 324/215, 228, 260, 258, 259

[56] References Cited

U.S. PATENT DOCUMENTS

| | | | |
|---|---|---|---|
| 3,015,725 | 1/1962 | Hofstetter | 246/247 |
| 3,058,059 | 10/1962 | Bockemuehl | 246/249 |
| 3,509,469 | 4/1970 | Strange | 324/41 |
| 3,792,241 | 2/1974 | Sullivan | 235/92 PK |
| 3,941,338 | 3/1976 | Knudsen | 246/247 |

FOREIGN PATENT DOCUMENTS

| | | | |
|---|---|---|---|
| 909023 | 10/1962 | United Kingdom | 246/249 |
| 943780 | 12/1963 | United Kingdom | 246/249 |

*Primary Examiner*—Trygve M. Blix
*Assistant Examiner*—Reinhard J. Eisenzopf
*Attorney, Agent, or Firm*—Joseph S. Iandiorio

[57] ABSTRACT

A variable permeability magnetic object detection device including an electromagnetic sensing coil; a core disposed in the electromagnetic sensing coil having a first permeability when the core is magnetically saturated and a second different permeability when the core is magnetically unsaturated; a magnetic member proximate the electromagnetic sensing coil for providing a magnetic field in the core for operating the core in a magnetically saturated state without a magnetic object to be detected present in the area proximate the electromagnetic sensing coil, interacting with the magnetic field, and for operating the core in a magnetically unsaturated state with the magnetic object to be detected present in the area proximate the magnetic sensing coil, interacting with the field; and a detector responsive to said electromagnetic sensing coil to detect the presence of a magnetic object.

8 Claims, 10 Drawing Figures

MAGNETIC OBJECT DETECTION DEVICE

Matter enclosed in heavy brackets [ ] appears in the original patent but forms no part of this reissue specification; matter printed in italics indicates the additions made by reissue.

FIELD OF INVENTION

This invention relates to a variable permeability magnetic object detection device.

BACKGROUND OF INVENTION

Contemporary railroad data processing systems require information relating to the number of railroad cars in a particular place or in a particular train. Presently, such information may be derived from trackside wheel detectors which count the number of wheels passing along the adjacent rail and divided by the proper constant to obtain the number of cars. There are currently a number of different types of wheel detectors available each of which has significant shortcomings. In one type a primary magnet provides magnetic flux through a switch and the neighboring rail. A secondary magnet provides through the switch an offsetting flux normally insufficient to overcome the primary flux. The switch normally resides in a first position. Upon arrival of a railroad car the magnetic mass of a wheel enters the primary magnetic field reducing the flux through the switch and enabling the secondary flux to overcome the primary flux in the switch and drive the switch to its second position. This type of wheel detector is expensive, complex and uses a great number of parts. The second type of wheel detector uses three a.c. energized coils. As the wheel passes over them the disturbance of the flux pattern causes a phase shift between the coils which can be detected as a wheel-passing. This device must be carefully monitored. Another type uses a magnetic reed switch held in one position by magnetic flux and allowed to switch to a second position when a wheel interrupts the flux pattern. This device is primarily mechanical in nature and suffers the same reliability shortcomings as other mechanical devices. Yet another device uses a transmitter on one side of a rail and a receiver on the other. The improved reception brought about by the presence of a wheel is detected. This type is quite complex and expensive. Still other detectors employ a latch that is physically tripped by the wheel.

SUMMARY OF INVENTION

It is therefore a general object of this invention to provide an improved, simple, inexpensive and extremely reliable magnetic object detecting device requiring no moving parts.

It is a further object of this invention to provide such a magnetic object detecting device which relies on a change in permeability to detect a magnetic object.

It is a further object of this invention to provide such a magnetic object detecting device which is capable of determining the sense of direction of relative motion between a magnetic object and the device as well as detecting the proximity of the object.

It is a specific object of this invention to provide a wheel detector for detecting the magnetic mass of a railroad car wheel.

The invention results from the realization that the core of an electromagnetic sensing coil could be arranged in a magnetic field so that the field flux is sufficient to saturate the core in the absence of a detectable object but insufficient to do so when the object is proximate the coil, interfering with the field flux, and the further realization that the difference in permeability of the core between the saturated and unsaturated states could be detected as an indication of proximity of a magnetic object.

A specific circuit for detecting that change in permeability resulted from the further realization that the change in inductance of the coil rendered by the change in permeability could be used to vary the resonance of an oscillator circuit of which the coil is a part.

The invention features a variable permeability magnetic object detection device including an electromagnetic sensing coil and a core disposed in the electromagnetic sensing coil and having a first permeability when the coil is magnetically saturated and a second, different permeability, when the core is magnetically unsaturated. A magnetic member proximate the electromagnetic sensing coil provides a magnetic field in the core for operating the core in a magnetically saturated state without a magnetic object to be detected present in the area proximate the electromagnetic sensing coil, interacting with the magnetic field, and for operating the core in a magnetically unsaturated state when the magnetic object to be detected is present in the area proximate the electromagnetic sensing coil, interacting with the magnetic field. Means responsive to said electromagnetic sensing coil detect the presence of a magnetic object.

DISCLOSURE OF PREFERRED EMBODIMENT

Other objects, features and advantages will occur from the following description of a preferred embodiment and the accompanying drawings, in which.

Figure 1:
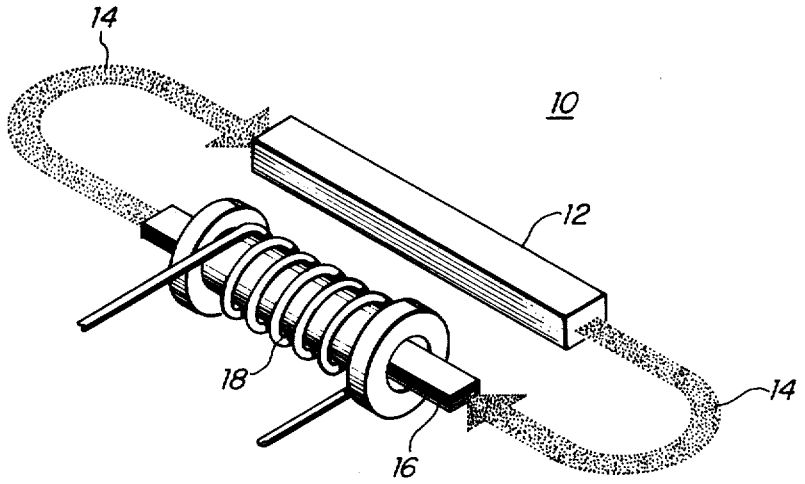
FIG. 1 is a schematic diagram of the arrangement of an electromagnetic sensing coil, core and magnetic member according to this invention.

The invention operates on the principle that a magnetically saturated core material has a different permeability than that of unsaturated core material and that the inductance of the coil surrounding the core material will vary with the permeability. The difference in inductance reflecting the difference in permeability may be detected and used to indicate that the core material has changed from a saturated to an unsaturated state or conversely that the core material has changed from an unsaturated to a saturated state. Typically a magnet member is used to provide a sufficient magnetic field through the core material to keep the core material magnetically saturated in the absence of a magnetic object which is to be detected. Consequently when a magnetic object is detected which interferes with the magnetic field a portion of that magnetic field will no longer pass through the core material but will pass through the magnetic object. As a result the magnetic field through the core material is no longer sufficient to keep the core material magnetically saturated. This change from the saturated state to the unsaturated state changes the permeability of the core material and the inductance of the electromagnetic coil.

The magnetization characteristic for core material is represented by a plot of the magnetizing force H along the abscissa versus the flux density B produced by that magnetizing force along the ordinate. The first part of the curve rises rather steeply until the magnetic material becomes saturated at which point a knee is formed and the curve generally levels off. The first, steeper, portion has a permeability $\mu_1$ representing the unsaturated condition and a permeability $\mu_2$ above the knee representing the saturated condition. The simple equation for the curve is $B=\mu H$ where $\mu$, the permeability of the material, is the measure of its ability to carry the flux B for any particular magnetizing force H. The inductance L of a coil may be calculated and is a function of $\mu$ so that any change in the permeability of the coil will also change the inductance of the coil.

The invention is accomplished with a varying permeability magnetic object detection device which detects the presence of a magnetic object to be detected when either one or both, the object to be detected and the magnetic object detection device, are in motion. The device may employ an electromagnetic sensing coil and a core disposed in the electromagnetic sensing coil having a first permeability when the core is magnetically saturated and a second, different, permeability when the core is magnetically unsaturated. A magnetic member near the electromagnetic sensing coil provides a magnetic field in the core for operating the core in a magnetically saturated state when there is no magnetic object to be detected present in the area proximate the electromagnetic sensing coil, interacting with the magnetic field, and for operating the core in the magnetically unsaturated state with a magnetic object to be detected present in the area proximate the electromagnetic sensing coil, interacting with the magnetic field. Means are provided, responsive to the electromagnetic sensing coil, to detect the presence of a magnetic object.

In one embodiment the means for detecting includes an oscillator circuit interconnected with the electromagnetic sensing coil for producing a signal within a predetermined frequency range as a function of the inductance of the electromagnetic sensing coil with the core magnetically saturated. Signals will occur in another range other than a predetermined frequency range when the core is in a magnetically unsaturated state. The magnetic member for providing the magnetic field flux may be either a permanent magnet or an electromagnet. A counter may be used to count the signal cycles emanating from the oscillator circuit and a control circuit may be used to enable that counter to count only during a preestablished period. If the count is in the first count range an indication is made that a magnetic object has been detected and if the count during that period is in the second count range an indication is made that a magnetic object has not been detected.

In embodiments where the magnetic object detector is used to count wheels of a railroad car or some similar application it is convenient to have a suppression circuit for preventing repeated indication of detection of the same magnetic object i.e. counting the same wheel a number of times as it passes the electromagnetic sensing coil. The suppression circuit may include a first circuit responsive to a first count in the second count range and to an indication that a magnetic object has not been previously detected to provide a signal representing that a magnetic object has not been detected, and a second circuit responsive to a second count in the second count range to provide an indication that a magnetic object has not been detected in the absence of an indication that a wheel has not been previously detected. Two or more magnetic object detection devices may be used together in a system and may be combined with a direction sensing device in order to detect the presence of a magnetic object and the direction in which it is moving.

There is shown in FIG. 1 a magnetic object detection device 10 including a permanent magnet 12 which supplies a magnetic field 14 to core material 16 in coil 18 sufficient to maintain core 16 in the saturated condition. When a magnetic object is brought close to device 10, or device 10 is brought close to a magnetic object, the magnetic field 14 redistributes itself so that a portion of it flows through the magnetic object as well as core material 16. As a result the field 14 is no longer sufficient to maintain core material 16 in the saturated condition. The permeability of the core material 16 then changes changing the inductance of coil 18.

Figure 2:
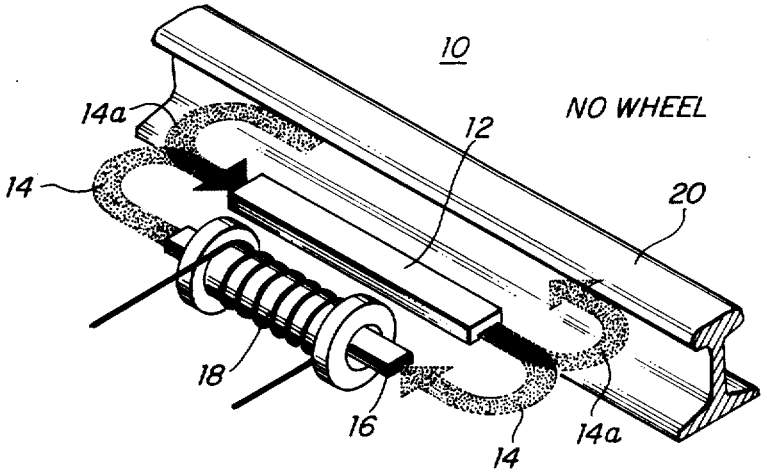
FIG. 2 is a schematic diagram of a wheel detector embodiment of the magnetic detection device of this invention arranged proximate the rail of a railroad track showing the magnetic field when no wheel is present.

In one specific embodiment device 10, FIG. 2, is disposed proximate a rail 20 for detecting the magnetic mass of railroad car wheels as they pass along rail 20 proximate device 10. In this application magnet member 12 provides a magnetic field 14a in rail 20 as well as field 14 sufficient to keep core material 16 in a saturated state.

Figure 3:
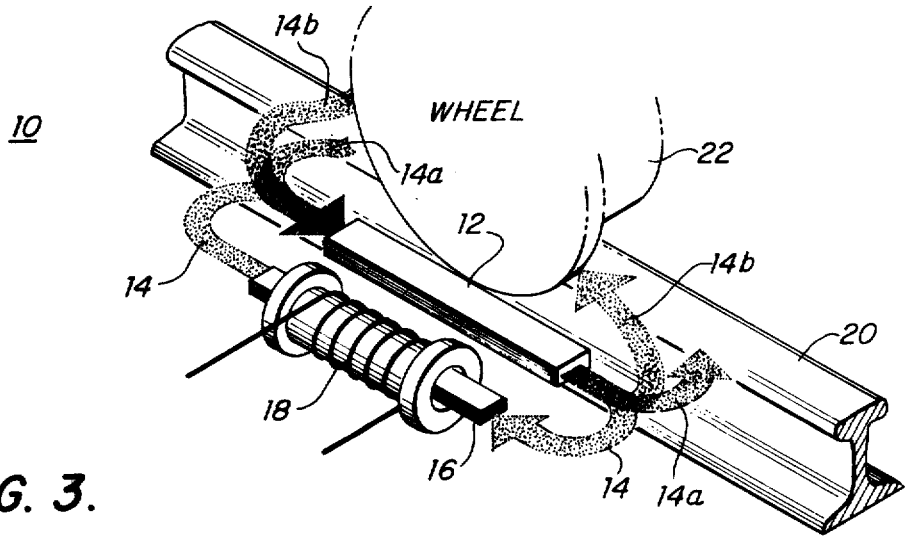
FIG. 3 is a diagram similar to FIG. 2 showing the magnetic field when a wheel is present.

When a wheel 22, FIG. 3, moving along rail 20 comes near enough to device 10 a portion of the magnetic field 14b is drawn off to pass through wheel 22. As a result magnet member 12 is no longer able to provide a magnetic field 14 to core material 16 sufficient to keep core material 16 magnetically saturated. Thus the core material 16 switches from the saturated to the unsaturated state causing a change in the permeability of core material 16 and in the inductance of coil 18. Detection of the magnetic object is accentuated by using a core material that has a sharp knee in its magnetization characteristic: materials which have a substantial difference in their permeability between the saturated and unsaturated state make the best core material for this invention. One specific material which works well is Hy$\mu$80 provided by Magnetic Metals, Inc.

Figure 4:
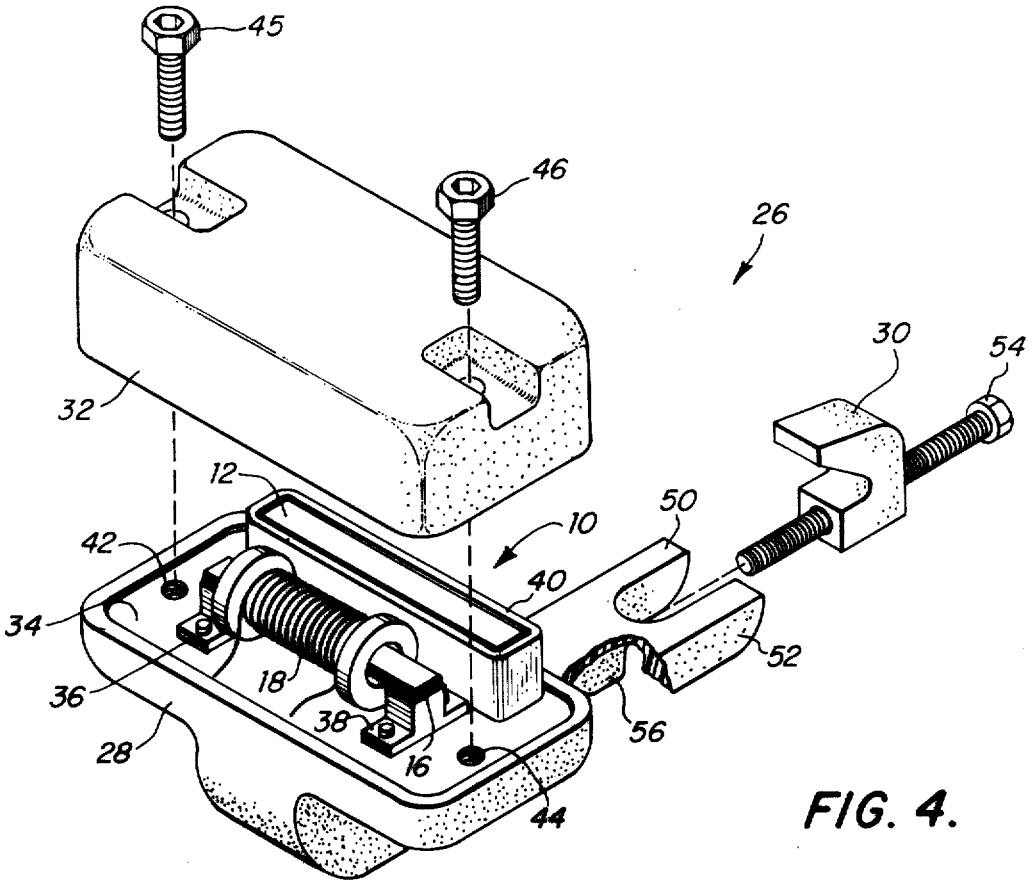
FIG. 4 is a diagrammatic, axonometric view of an electromagnetic coil, core and magnet member in a housing adapted for mounting on a railroad track.
Figure 5:
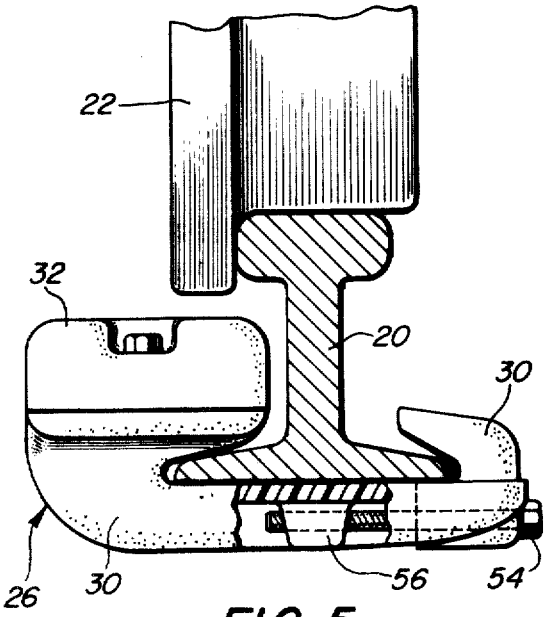
FIG. 5 is a diagrammatic end view of the rail of a railroad track with the housing of FIG. 4 mounted thereon and a railroad car wheel passing along the track proximate the housing.

Magnetic object detection device 10 including magnet 12, core 16 and coil 18 may be mounted in a primarily nonmagnetic housing 26, FIG. 4, including a base 28, clamp member 30 and cover 32. Base 28 includes a mounting plate 34 having pedestals 36, 38 on which core 16 is mounted and a trough 40 in which magnet member 12 is disposed. A pair of threaded holes 42, 44 may be provided in mounting plate 34 to receive bolts 45 and 46 which secure cover 32 to base 28. Base 28 is provided with a pair of spaced fingers 50, 52 for receiving clamp member 30 for clamping to the base flange of a railroad rail. Mounting screw 54 in clamp member 30 is engaged with threads in clamping block 56 formed as a part of base 28. Housing 26 is shown clamped in position on rail 20 in FIG. 5, with a railroad car wheel 22 just passing over it.

Figure 6:
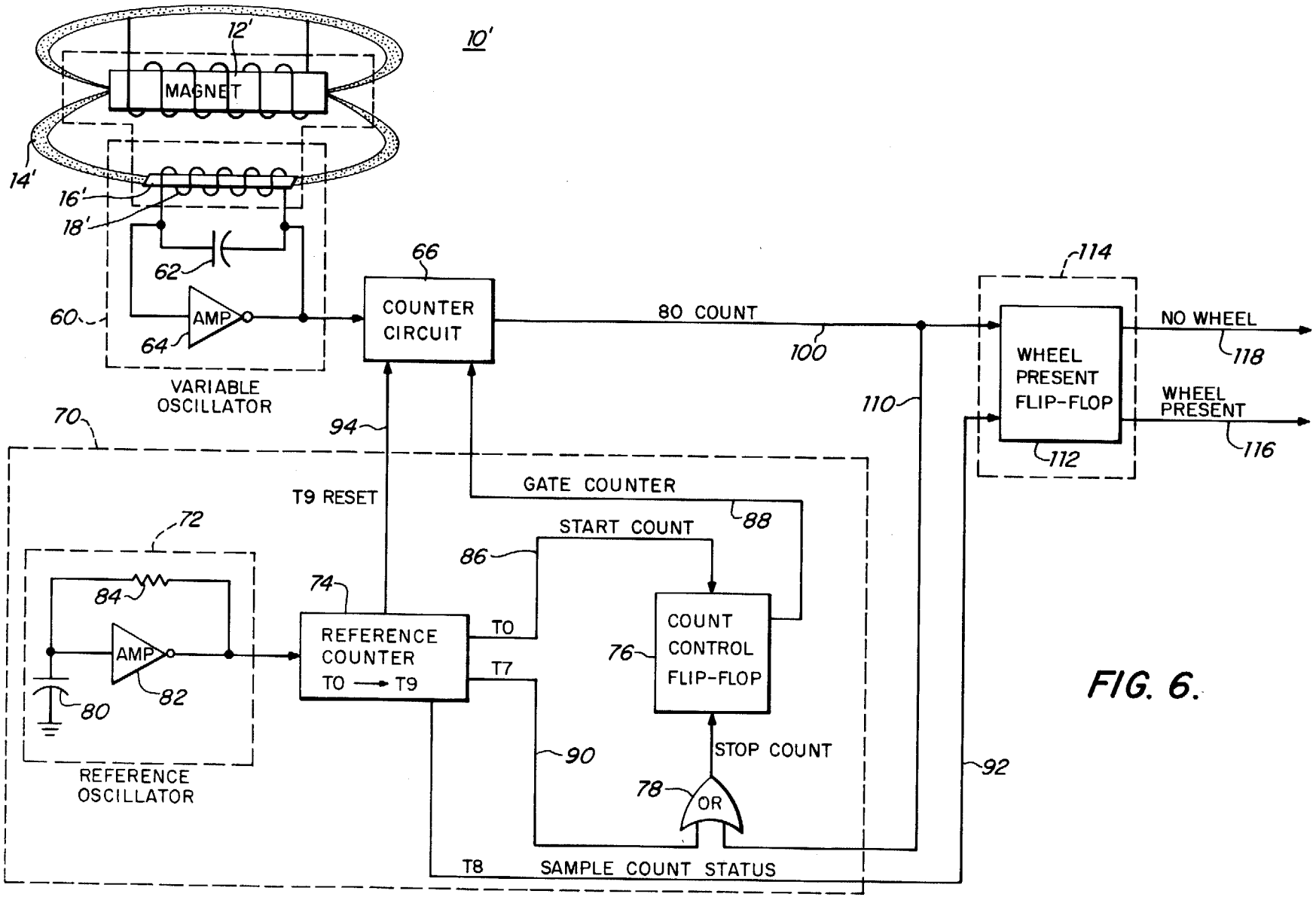
FIG. 6 is a schematic diagram of a circuit responsive to the output of the electromagnetic coil for determining whether a wheel has passed the coil.

In one specific embodiment magnetic detection device 10', FIG. 6, includes an electromagnetic member 12' which provides a magnetic field 14' through core 16' sufficient to keep core 16' in the saturated state in the absence of the magnetic object to be detected proximate the electromagnetic sensing coil 18', and interfering with magnetic field 14'. Electromagnetic sensing coil 18' also forms a part of oscillator circuit 60 which includes a capacitor 62 in parallel with coil 18' and an amplifier 64. The output of oscillator 60 is provided to counter circuit 66. Control circuit 70 includes a reference oscillator circuit 72, a reference counter 74, count control flip-flop 76 and OR gate 78. Reference oscillator circuit 72 includes capacitor 80, amplifier 82 and resistor 84; reference counter 74 repeatedly, continuously, counts T0 to T9. Each time it reaches time T0 it provides on line 86 a start-count signal to count control flip-flop 76 which in turn provides on line 88 a gate-counter signal to counter circuit 66 enabling it to begin counting. Each time reference counter reaches the count T7 it supplies a signal on line 90 or OR gate 78 which in turn provides a stop-count signal to count control flip-flop 76 to cease output of the gate-counter signal on line 88 and disables counter circuit 66 from further counting pulses at its input. Each time reference counter 74 reaches the count T8 a sample-count-status-signal is provided on line 92. And each time reference counter 74 reaches the count T9 a reset signal is delivered on line 94 to reset counter circuit 66.

In this embodiment counter circuit 66 may be designed to accumulate a count of 100 or more. When counter 66 reaches a count of 80 a signal is provided on line 100 to wheel-present flip-flop 112 in indicator circuit 114 which has a wheel-present output 116 and no-wheel-present output 118. In this embodiment an accumulated count of 80 or more indicates no wheel is present and a count of 79 or less indicates a wheel is present. Thus, if counter 66 reaches a count of 80 before it is halted at time T7, the signal on line 100 to flip-flop 112, and the sample-count-status-signal on line 92 at time T8 enables flip-flop 112 to provide a no-wheel present signal at output 118. If counter 66 only reaches a count of 79 or below by time T7 there is no signal on line 100 at time T7 and at time T8 the sample-count-status enables flip-flop 112 to provide a wheel-present signal at output 116.

In operation with no wheel present electromagnetic coil 18' has an inductance of approximately 3 mH and oscillator circuit 60 is oscillating at approximately 125 KHz. At time T0 reference counter 74 provides a start-count signal to count control flip-flop 76 which then provides an enabling gate-counter signal on line 88 to start counter circuit 66 to counting. It counts until either time T7 has been reached at which point a signal on line 90 to OR gate 78 provides a stop-count signal to count control flip-flop 76 which turns off the gate-counter signal on line 88 and disables counter circuit 66 or a count of 80 has been reached by counter 66 which provides a signal on line 100 and line 110 which causes OR gate 78 to provide the stop-count signal to count control flip-flop 76 which ceases the production of gate-counter signal on line 88 and thereby disables counter circuit 66 before the time T7. Assuming no wheel present, the latter event occurs first and at time T8 the sample-count-status signal on line 92 causes wheel-present flip-flop 112 to provide the wheel-not-present signal at output 118. As a wheel approaches the count drops until finally a count of no more than 79 is reached before time T7 when a signal on line 90 results in the disabling of counter circuit 66. At time T8 wheel present flip-flop 112 provides a wheel-present signal at output 116 and ceases to produce the wheel-not-present signal at output 118. As the wheel moves closer to electromagnetic sensing coil 18' the count may drop even farther below 79. At each succeeding occurrence of the sample-count-status signal at time T8 on line 92 the wheel-present signal is updated at output 116 while the wheel-not-present signal is not provided at output 118. As the wheel begins to leave the area of coil 18' and magnetic field 14' the count once again begins to rise; when it reaches a count of 80 or above the signal on line 100 is once again provided to flip-flop 112. Wheel present flip-flop 112 will respond to that signal at time T8 upon the occurrence of the sample-count-status signal on line 92 to enable the no-wheel present output 118 and disable the wheel-present output 116 of flip-flop 112.

Figure 7:
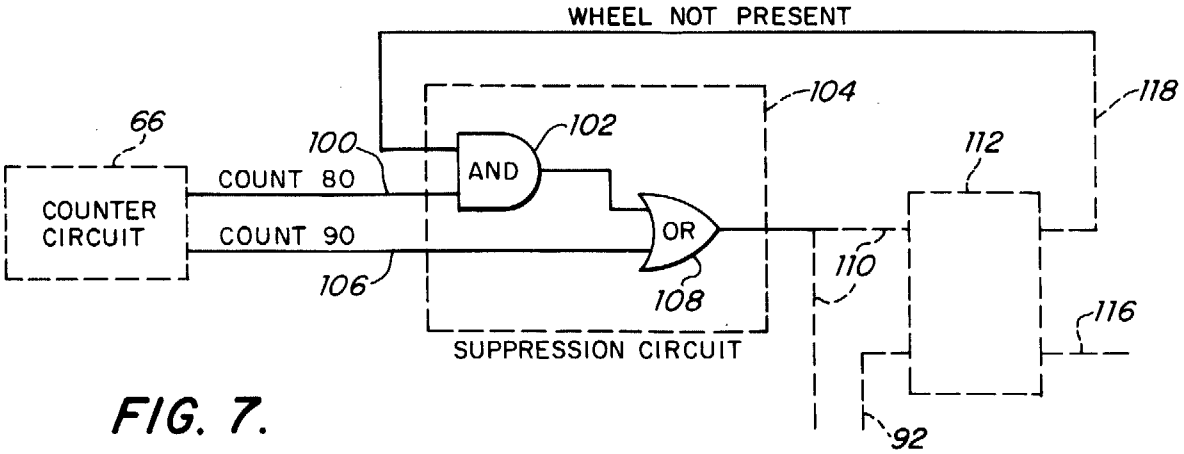
FIG. 7 is a schematic diagram of a suppression circuit which may be used in the circuit of FIG. 6.

In any application in which there is relative motion between the detection device and the object to be detected there is the possibility that the relative motion may cease or become so slow that the detection device cycle time (T0–T7) occurs more than once while the presence of the object is maintaining the device in the unsaturated state. This is an especially important consideration when the invention is used as a wheel detector to detect railroad car wheels; for in that case it is important that each wheel be counted only once so that the number of cars can be accurately determined. In order to ensure that a wheel moving slowly passed a sensor or stopped in the area of a sensor is not counted more than once, suppression circuit 104, FIG. 7, is useful. It includes AND gate 102 and OR gate 108. AND gate 102 is enabled by the wheel-not-present signal on output 118 and the signal on line 100 at count 80. OR gate 108 provides an output on line 110 either when AND gate 102 is enabled or by a signal on line 106 when a count of 90 is reached. Suppression circuit 104 provides a buffer zone between the level of the count 80 used to recognize the absence of a wheel when there has been no wheel present in the immediate previous cycle and the count 90 used to identify the absence of a wheel when there has been a wheel present in the immediately previous cycle. This is done to avoid ambiguous conditions: where the count is at 79½ there could be produced a wheel-present signal followed by a no-wheel-present signal followed by a wheel-present signal and so on until the wheel fully entered or left the area. Such action would result in an erroneous wheel count. The longer the wheel is in the ambiguous area, the greater is the possible counting error.

In operation as a wheel approaches, the inductance of electromagnetic coil 18' begins to increase and the frequency of oscillator circuit 60 to decrease. Therefore the number of counts that could be accumulated in the period T0 to T7 begins to decrease from 100 or more down through 90 and 80. When the wheel so interferes with the magnetic field that the frequency has dropped sufficiently low enough, so that the counter circuit 66 can reach a count of no more than 79 before time T7 is reached, the wheel is recognized. As a result there is no output on line 110, and no signal is presented to that input of wheel present flip-flop 112.

At time T8 when sample-count status signal on line 92 is presented to wheel present flip-flop 112 the proper signal is not present on line 110 at the input to flip-flop 112 and the wheel-not-present signal is not provided on line 118. But a wheel present signal will be provided on line 116 to further data processing equipment as an indication of a wheel detection. As long as the wheel is present in the area so that the count does not exceed 79, wheel-present signal on line 116 is maintained; as the wheel begins to leave the area and the count to rise, the count reaches 80 and a signal is provided on line 100. However, since a wheel was present at the last sample as indicated by the wheel-present signal on line 116, the wheel-not-present signal will not be present on line 118 and AND gate 102 will not be enabled. Thus even though the count of 80 has been reached the required output is not provided by AND gate 102 to OR gate 108.

The same result occurs through additional cycles of reference counter 74 until the wheel has moved far enough away so that the count reaches 90. At that point a signal is provided on line 106 to OR gate 108 which then provides a signal on line 110 to OR gate 78 and wheel present flip-flop 112. Following that at time T8 the sample-count-status signal on line 92 causes wheel present flip-flop to respond to the signal on line 110, cut-off the wheel present signal on line 116, and once again provide the wheel-not-present signal on line 118, enabling AND gate 102.

Thus in the very next cycle of reference counter circuit 74, counter circuit 66 provides a signal on line 100 just as soon as count 80 is reached and that signal on line 100 is reflected through enabled AND gate 102 and OR gate 108 to line 110 to indicate that no wheel is present.

Figure 8:
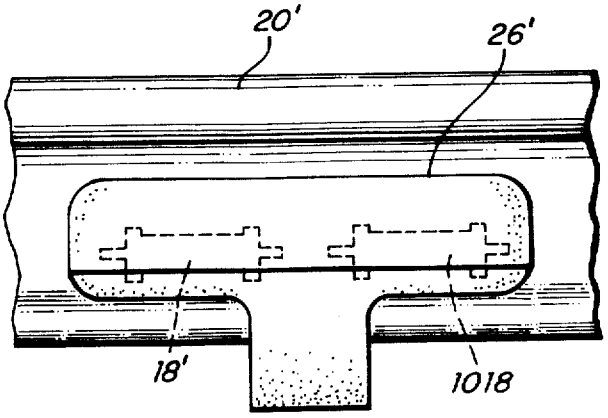
FIG. 8 is a schematic diagram showing a dual magnetic object detection device attached to a portion of a railroad track rail.
Figure 9:
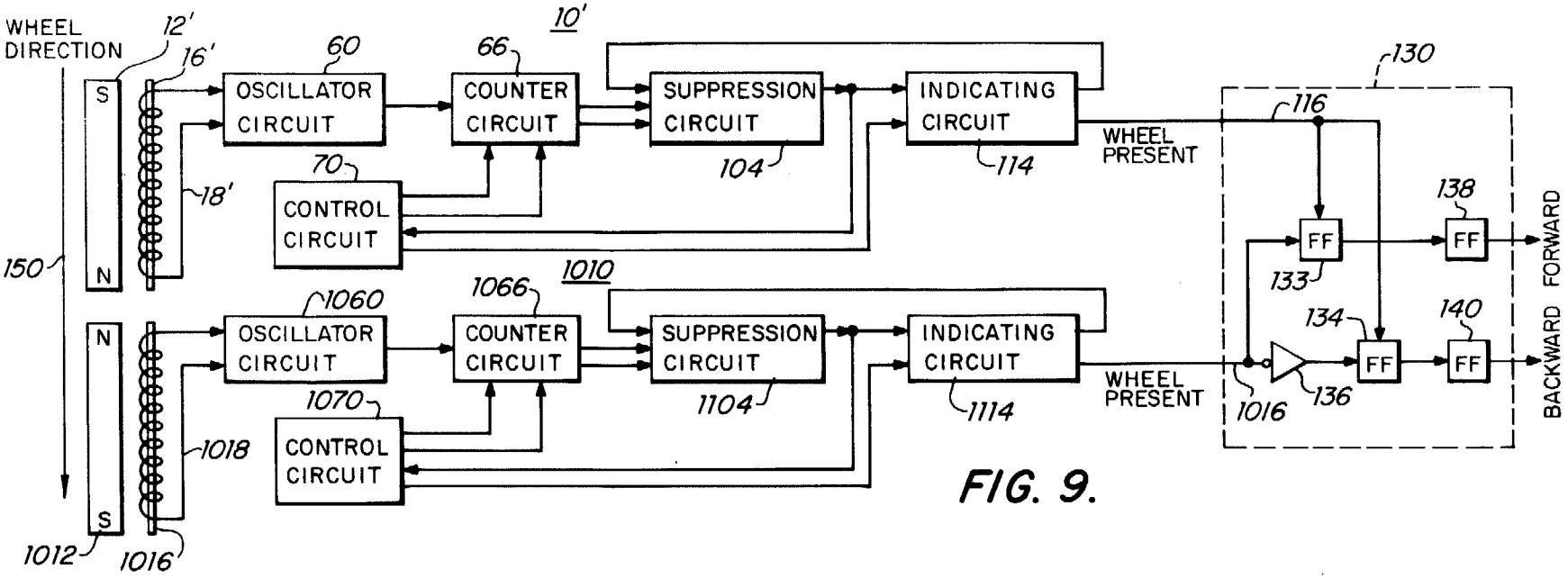
FIG. 9 is a schematic block diagram of the dual detection device of FIG. 8 with a sense of direction determining circuit.

More than one magnetic object detection device may be grouped together to provide greater reliability and/or direction sensing capability. For example, in FIG. 8, dual housing 26' attached to rail 20' includes two magnetic object detecting devices symbolically represented by electromagnetic coils 18' and 1018 shown in phantom. Housing 26' may in all respects be identical with housing 26 with the provision that it have sufficient room for two systems instead of just one. The arrangement of two such magnetic object detection devices similar to that described in FIG. 6 is shown in FIG. 9 in combination with a direction sensing circuit 130. The two magnetic object detection devices 10' and 1010 in FIG. 9 are identical i.e. device 10' has a magnetic member 12', core 16', electromagnetic coil 18', oscillator circuit 60, counter circuit 66, control circuit 70, suppression circuit 104, and indicating circuit 114 as shown in greater detail in FIG. 6.

Magnetic object detecting device 1010 includes collateral components: magnetic member 1012, core 1016, electromagnetic coil 1018, oscillating circuit 1060, counter circuit 1066, control circuit 1070, suppression circuit 1104 and indicating circuit 1114 connected in the same way as in device 10'. Direction sensing device 130 includes flip-flop 133 and flip-flop 134, each of which is gated by a wheel-present signal on line 116 from indicating circuit 114. The wheel-present output on line 1016 from indicating circuit 1114 is fed directly to the input of flip-flop 133 but through inverter 136 and then into flip-flop 134. Flip-flops 133 and 134 trigger on a positive going signal presented at their input, if they are receiving the gating signal from the indicating circuit 114 at the same time. The output of the flip-flop 133 is delivered to forward flip-flop 138 and the output of flip-flop 134 is delivered to backward flip-flop 140.

Figure 10:
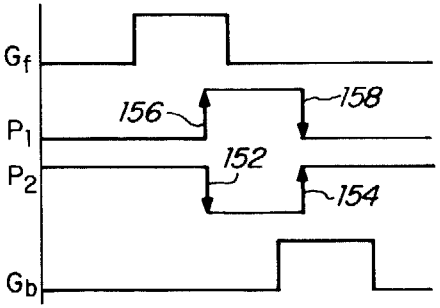
FIG. 10 is a timing diagram showing the relationship of certain signals which occur in the sense of direction determining circuits of FIG. 9.

In operation if the wheel is moving past the device in the direction shown by arrow 150, FIG. 9, the wheel present signal on line 116 from indicating circuit 114 provides the gating signal $G_f$ as shown in FIG. 10. At a later time the wheel present signal appears on line 1016 and is presented as signal $P_1$ to flip-flop 133 and, after inverting, as signal $P_2$ to flip-flop 134. Since it is the negative going portion 152, not the positive going portion 154, of signal $P_2$ which occurs during the period of gating signal $G_f$ flip-flop 134 is not triggered. However, since the positive portion 156 and not the negative portion 158 of signal $P_1$ does occur during the period of gating signal $G_f$ flip-flop 133 is triggered and in turn triggers flip-flop 138 to indicate that the sense of direction is forward.

Conversely, if the wheel is moving in the direction opposite to that shown by arrow 150 i.e. the backward direction, the wheel-present signal on line 1016 occurs first i.e. signal $P_1$ is presented to flip-flop 133 and signal $P_2$ is presented to flip-flop 134 before the wheel-present signal occurs on line 116 as the gating signal $G_b$. Therefore the negative going portion 158 of signal $P_1$ occurs during the gating signal $G_b$ and flip-flop 133 will not be triggered. However, the positive going portion 154 of signal $P_2$ does occur during the gating signal $G_b$ and so flip-flop 134 will be triggered setting flip-flop 140 to indicate the backward direction.

The circuit of FIG. 6 or 9 can be disposed in the housing beneath the coil, between the pedestals or beneath the mounting plate or externally of and/or remote from the housing.

Other features and advantages will occur to those skilled in the art and are within the following claims:

What is claimed is:

[1. A variable permeability magnetic object detection device comprising:

an electromagnetic sensing coil;

a core disposed in said electromagnetic sensing coil and having a first permeability when said core is magnetically saturated and a second, different, permeability when said core is magnetically unsaturated;

a magnetic member proximate said electromagnetic sensing coil for providing a magnetic field in said core for operating said core in a magnetically saturated state without a magnetic object to be detected present in the area proximate said electromagnetic sensing coil, interacting with said magnetic field, and for operating said core in a magnetically unsaturated state with a magnetic object to be detected present in the area proximate said electromagnetic sensing coil, interacting with said magnetic field; and means, responsive to said electromagnetic sensing coil, to detect the presence of a magnetic object.]

[2. The device of claim 1 in which said means to detect includes an oscillator circuit interconnected with said electromagnetic sensing coil, for producing a signal within a predetermined frequency range as a function of the inductance of said electromagnetic sensing coil with said core magnetically saturated.]

[3. The device of claim 2 in which said means to detect further includes means, responsive to said oscillator circuit, for determining whether said oscillator is oscillating within said predetermined frequency range.]

[4. The device of claim 3 in which said means for determining includes counter means for counting the cycles of said signal; control means for enabling said counter means to count only during a preestablished period; and means, responsive to said means for counting, for indicating that a magnetic object has been detected in response to a count in a first count range and that a magnetic object has not been detected in response to a count in a second count range.]

5. The device of claim [4] *17* in which said means for detecting further includes a suppression circuit for establishing a buffer count range for preventing repeated indications of detection of the same magnetic object including a first circuit responsive to a first count in said second count range and to an indication from said means for indicating that a magnetic object has not been previously detected for providing a signal representing to said means for indicating that a magnetic object has not been detected and a second circuit responsive to a second count in said second count range for providing to said means for indicating a signal representing that a magnetic object has not been detected in the absence of an indication from said means for indicating that a magnetic object has not been previously detected.

[6. The device of claim 1 in which said magnetic member includes at least one permanent magnet.]

[7. The device of claim 1 in which said magnetic member includes at least one electromagnet.]

[8. A magnetic object detection and direction sensing system comprising:

first and second variable permeability magnetic object detection devices each including:

an electromagnetic sensing coil;

a core disposed in said electromagnetic sensing coil and having a first permeability when said core is magnetically saturated and a second, different permeability when said core is magnetically unsaturated;

a magnet member proximate said electromagnetic sensing coil for providing a magnetic field in said core for operating said core in a magnetically saturated state without a magnetic object to be detected present in the area proximate said electromagnetic sensing coil, interacting with said magnetic field, and for operating said core in a magnetically unsaturated state with a magnetic object to be detected present in the area proximate said electromagnetic sensing coil, interacting with said magnetic field; and means, responsive to said electromagnetic sensing coil, to detect the presence of a magnetic object; and a direction sensing device, responsive to each of said means to detect the presence of a magnetic object, for determining whether said first detection device or said second detection device first detected a magnetic object.]

[9. A wheel detector for detecting the magnetic mass of a railroad car wheel comprising:

a housing for mounting on the rail of railroad tracks, a variable permeability magnetic detection device carried by said housing and including:

an electromagnetic sensing coil;

a core disposed in said electromagnetic sensing coil and having a first permeability when said core is magnetically saturated and a second, different, permeability when said core is magnetically unsaturated;

a magnetic member proximate said electromagnetic sensing coil for providing a magnetic field in said core for operating said core in a magnetically saturated state without a magnetic object to be detected present in the area proximate said electromagnetic coil, interacting with said magnetic field, and for operating said core in a magnetically unsaturated state with a magnetic object to be detected present in the area proximate said electromagnetic sensing coil, interacting with said magnetic field; and means, responsive to said electromagnetic sensing coil, to detect the presence of a magnetic object.]

[10. A wheel detector for detecting the magnetic mass of a passing railroad car wheel and its sense of direction comprising:

a housing for mounting on the rail of a railroad track;

first and second variable permeability magnetic detection devices mounted in said housing each including:

an electromagnetic sensing coil;

a core disposed in said electromagnetic sensing coil and having a first permeability when said core is magnetically saturated and a second, different permeability when said core is magnetically unsaturated;

a magnetic member proximate said electromagnetic sensing coil for providing a magnetic field in said core for operating said core in a magnetically saturated state without a magnetic object to be detected present in the area proximate said electromagnetic sensing coil, interacting with said magnetic field, and for operating said core in a magnetically unsaturated state with a magnetic object to be detected present in the area proximate said electromagnetic sensing coil, interacting with said magnetic field; and means, responsive to said electromagnetic sensing coil, to detect the presence of a magnetic object; and a direction sensing device, responsive to each of said means to detect the presence of a magnetic object, for determining whether said first detection device or said second detection device first detected a magnetic object.]

*11. A variable permeability magnetic object detection device comprising:*

*a magnetically permeable core;*

*a coil disposed on said core and an oscillator whose output frequency depends on the reactance of said coil;*

*a magnetic member for producing a magnetic field which saturates the core in the absence of an object to be detected, and when the object is nearby permeates the object and does not saturate the core; and*

*means for distinguishing between the oscillator output frequencies associated with the unsaturated and saturated states of the core to detect the proximity of an object.*

*12. A variable permeability magnetic object detection device comprising:*

*an electromagnetic coil and an oscillator circuit whose output frequency depends upon the reactance of said coil;*

*a core disposed in the electromagnetic coil and having a first permeability when the core is magnetically saturated and a second different permeability when the core is magnetically unsaturated;*

*a magnetic member proximate the electromagnetic coil for providing a magnetic field in said core for operating said core in the magnetically saturated state without a magnetic object to be detected present in the area proximate the electromagnetic coil interacting with the magnetic field, and for operating the core in the magnetically unsaturated state with a magnetic object to be detected present in the area proximate the electromagnetic coil interacting with the magnetic field; and*

*means responsive to said oscillator circuit for determining whether said oscillator is oscillating within the predetermined frequency ranges associated with said saturated and unsaturated states.*

*13. A variable permeability magnetic object detection device comprising:*

*an electromagnetic coil;*

*a core disposed in said electromagnetic coil and having a first permeability when said core is magnetically saturated and a second, different, permeability when said core is magnetically unsaturated;*

*a magnetic member proximate said electromagnetic coil for providing a magnetic field in said core for operating said core in a magnetically saturated state without a magnetic object to be detected present in the area proximate said electromagnetic coil, interacting with said magnetic field, and for operating said core in a magnetically unsaturated state with a magnetic object to be detected present in the area proximate said electromagnetic coil, interacting with said magnetic field;*

*means, responsive to said electromagnetic coil, to detect the presence of a magnetic object including an oscillator circuit responsive to said electromagnetic coil, for producing a signal within a predetermined frequency range as a function of the inductance of said electromagnetic coil with said core magnetically saturated; and*

*means, responsive to said oscillator circuit, for determining whether said oscillator is oscillating within said predetermined frequency range.*

*14. A magnetic object detection and direction sensing system comprising:*

*first and second variable permeability magnetic object detection devices each including:*

*an electromagnetic coil;*

*a core disposed in said electromagnetic coil and having a first permeability when said core is magnetically saturated and a second, different permeability when said core is magnetically unsaturated;*

*a magnetic member proximate said electromagnetic coil for providing a magnetic field in said core in a magnetically saturated state without a magnetic object to be detected present in the area proximate said electromagnetic coil, interacting with said magnetic field, and for operating said core in a magnetically unsaturated state with a magnetic object to be detected present in the area proximate said electromagnetic coil, interacting with said magnetic field;*

*means, responsive to said electromagnetic coil, to detect the presence of a magnetic object including an oscillator circuit responsive to said electromagnetic coil, for producing a signal within a predetermined frequency range as a function of the inductance of said electromagnetic coil with said core magnetically saturated; and*

*a direction sensing device, responsive to each of said means to detect the presence of a magnetic object, for determining whether said first detection device or said second detection device first detected a magnetic object.*

*15. A wheel detector for detecting the magnetic mass of a railroad car wheel comprising:*

*a housing for mounting on the rail of railroad tracks;*

*a variable permeability magnetic detection device carried by said housing and including:*

*an electromagnetic coil;*

*a core disposed in said electromagnetic coil and having a first permeability when said core is magnetically saturated and a second, different, permeability when said core is magnetically unsaturated;*

*a magnetic member proximate said electromagnetic coil for providing a magnetic field in said core for operating said core in a magnetically saturated state without a magnetic object to be detected present in the area proximate said electromagnetic coil, interacting with said magnetic field, and for operating said core in a magnetically unsaturated state with a magnetic object to be detected present in the area proximate said electromagnetic coil, interacting with said magnetic field;*

*means, responsive to said electromagnetic coil, to detect the presence of a magnetic object including an oscillator circuit responsive to said electromagnetic coil, for producing a signal within a predetermined frequency range as a function of the inductance of said electromagnetic coil with said core magnetically saturated; and*

*means, responsive to said oscillator circuit, for determining whether said oscillator is oscillating within said predetermined frequency range.*

*16. A wheel detector for detecting the magnetic mass of a passing railroad car wheel and its sense of direction comprising:*

*a housing for mounting on the rail of a railroad track;*

*first and second variable permeability magnetic detection devices mounted in said housing each including:*

*an electromagnetic coil;*

*a core disposed in said electromagnetic coil and having a first permeability when said core is magnetically saturated and a second, different permeability when said core is magnetically unsaturated;*

*a magnetic member proximate said electromagnetic coil for providing a magnetic field in said core for operating said core in a magnetically saturated state without a magnetic object to be detected present in the area proximate said electromagnetic coil, interacting with said magnetic field, and for operating said core in a magnetically unsaturated state with a magnetic object to be detected present in the area proximate said electromagnetic coil, interacting with said magnetic field;*

*means, responsive to said electromagnetic sensing coil, to detect the presence of a magnetic object including an oscillator circuit responsive to said electromagnetic coil, for producing a signal within a predetermined frequency range as a function of the induc-*

*tance of said electromagnetic coil with said core magnetically saturated; and*

*a direction sensing device, responsove to each of said means to detect the presence of a magnetic object, for determining whether said first detection device or said second detection device first detected a magnetic object.*

*17. A variable premeability magnetic object detection device comprising:*

*an electromagnetic sensing coil;*

*a core disposed in said electromagnetic sensing coil an having a first permeability when said core is magnetically saturated and a second, different, permeability when said core is magnetically unsaturated;*

*a magnetic member proximate said electromagnetic sensing coil for providing a magnetic field in said core for operating said core in a magnetically saturated state without a magnetic object to be detected present in the area proximate said electromagnetic sensing coil, interacting with said magnetic field, and for operating said core in a magnetically unsaturated state with a magnetic object to be detected present in the area proximate said electromagnetic sensing coil, interacting with said magnetic field;*

*an oscillator circuit interconnected with said electromagnetic sensing coil, for producing a signal as a function of the inductance of said electromagnetic sensing coil with said core magnetically saturated; and*

*counter means for counting the cycles of said signal; control means for enabling said counter means to count only during a preestablished period; and means, responsive to said means for counting, for indicating that a magnetic object has been detected in response to a count in a first count range and that a magnetic object has not been detected in response to a count in a second count range.*

* * * * *